UNITED STATES PATENT OFFICE.

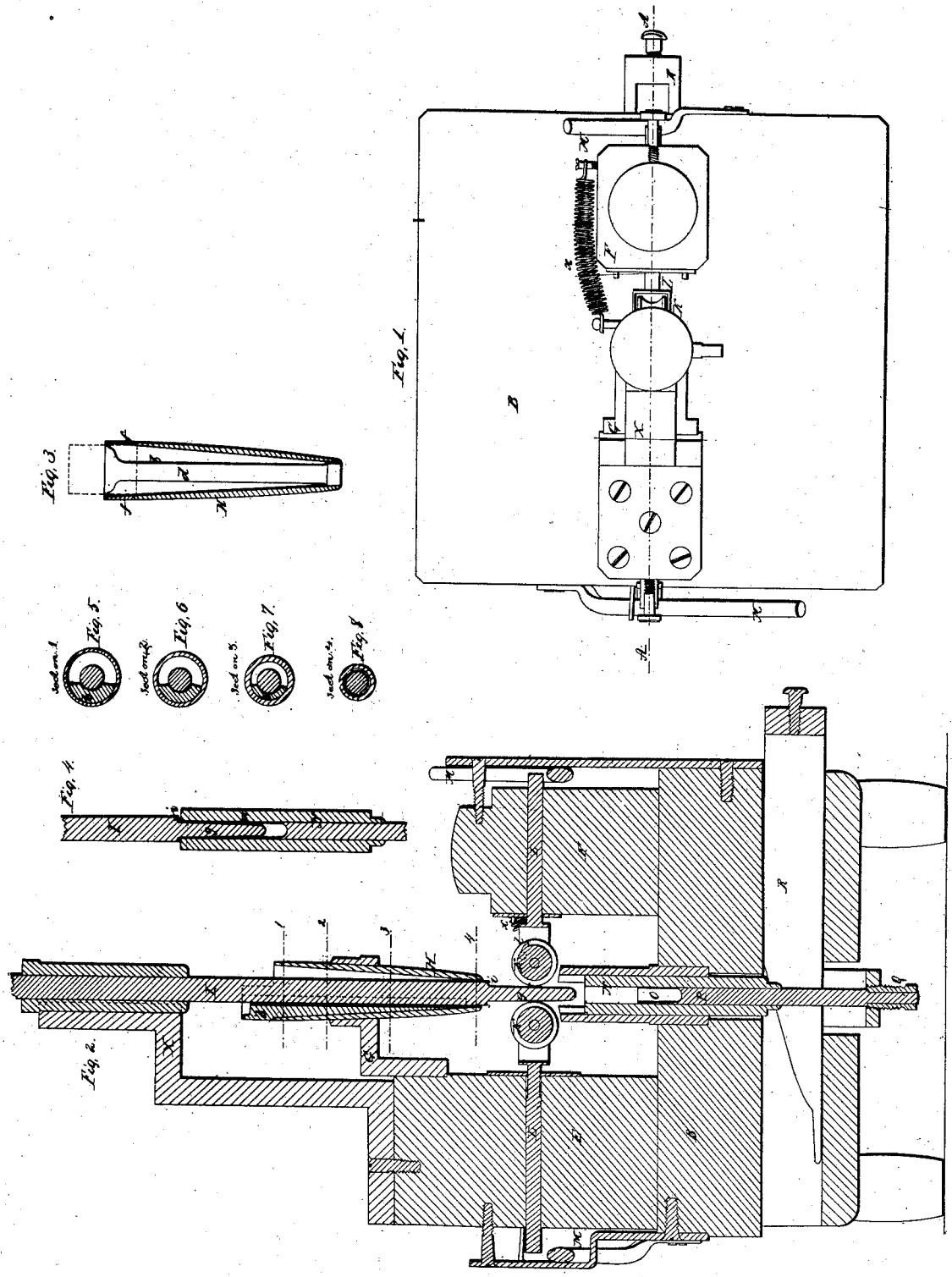

NATHANIEL WHITMORE, OF SOMERVILLE, MASSACHUSETTS, ASSIGNOR TO HIMSELF AND G. W. KEENE.

MAKING COP-TUBES.

Specification of Letters Patent No. 16,363, dated January 6, 1857.

*To all whom it may concern:*

Be it known that I, NATHANIEL WHITMORE, of Somerville, in the county of Middlesex and State of Massachusetts, have invented certain new and useful Improvements in Machines for Making Cop-Tubes, of which the following is a full, clear, and exact description, reference being had to the annexed drawings, making part of this specification, in which—

Figure 1 is a plan. Fig. 2 a section upon the line A A of Fig. 1. Fig. 3 a vertical section through the forming tube. Figs. 4, 5, 6, 7 and 8 details which will be referred to hereafter.

In the Letters Patent granted to me on the 12th June 1847 for machinery for making cop tubes, the tubes were formed by dies of peculiar construction, requiring care to keep them in order, and complicated machinery for their operation, in my improved machine, the tube is formed by forcing the piece of sheet metal into, and through a hollow conical tube in a manner which will now be particularly set forth.

My invention also consists in the use of grooved rollers for the purpose of closing and perfecting the tube and also in a peculiar form of step for the purpose of supporting the end of the tube while it is being flanged. These improvements are all applicable to machines which are automatic in their operation, and are actuated by power, the machine however which is represented in the accompanying drawings is a hand machine, the operation of which I will now proceed to describe.

B, is the bed of the machine from which rise the standards E and F, which support the operating parts. Upon a bracket G, projecting from the standard E, is supported the hollow cone or funnel H, upon one side of which is the backing $b$, which partially fills the cavity of the cone, the form of this cavity may be understood by a reference to Figs. 5, 6, 7 and 8 which represent sections upon the lines 1, 2, 3, and 4 of Fig. 2. Fig. 3 is a longitudinal section through the tube showing the depression $d$, in the backing for the accommodation of the large portion of the spindle I, which is supported in a suitable bracket X, in which it slides. This spindle is raised until its smaller portion is above the top of the tube and a suitably formed piece of sheet metal is placed at the mouth of the tube as indicated by the red lines in Fig. 3. In automatic machines, the edges $f$, may form the jaws of the shears used to prepare the blanks. The spindle is now depressed, the small portion $g$, passing in front of the blank, and the shoulder $i$ resting against its top edge; as the spindle continues to descend, the blank is caused to bend around into the funnel and by the time it reaches the bottom of the funnel, it has assumed the form of a tube, which by the continued descent of the spindle is carried between the grooved rolls K— here the tube is closed and perfected, a lip $l$, upon one of the rolls serving to bring together the extreme upper edge of the blank, this roll being held in the required position by the spring $x$. In power machines, this lip may be dispensed with and the rolls K, may be caused to make a partial revolution after the tube is forced between them, and thus draw it slightly off the spindle and close the edges near the upper end. The rolls are now caused to recede from each, the rods L, which hold them, being allowed to slide in the standards E, and F, after the levers M, which confine them, are moved out of the way—as the spindle continues to descend, it carries the tube into the receiver N, in which it is flanged, during which operation the bottom of the tube is supported by a peculiarly formed step. This step consists of a steel tube O, upon the top of a rod P the position vertically of which is adjusted by the screw Q, during the action of flanging the tube, the latter rests against the top edge of the step at $m$; the spindle entering into its cavity; and at the final instant of the descent of the spindle, the tube being prevented from opening by the receiver N, the flange upon its top is formed by the shoulder $i$, upon the spindle, as seen in Fig. 4, during this operation, the receiver is held rigidly by the block R, but upon the completion of the tube, this block is withdrawn and the receiver is allowed to descend, leaving the tube standing upon the top of the step.

The various motions of the machine may be performed by hand, or the machine may be made to perform them automatically in the proper order, these motions and the method of performing them form no part of my present invention and need not be further dwelt upon at present.

What I claim as my invention and desire to secure by Letters Patent, is—

1. The tube H with its backing $b$, in combination with the spindle I operating in the manner substantially as set forth for the purpose specified.

2. I claim the tubular step for the support of the tube while it is being flanged in combination with the receiver N, operating in the manner substantially as herein set forth.

NATHL. WHITMORE

Witnesses:
 THOS. R. ROACH,
 P. E. TESCHEMACHER.